United States Patent
Kim et al.

(10) Patent No.: US 9,609,538 B2
(45) Date of Patent: Mar. 28, 2017

(54) METHOD AND APPARATUS FOR EFFICIENTLY CONTROLLING AN MDT IN A PLURALITY OF PLMNS

(75) Inventors: Sang Bum Kim, Gyeonggi-do (KR); Gert Jan Van Lieshout, Middlesex (GB)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 186 days.

(21) Appl. No.: 14/123,746

(22) PCT Filed: Jun. 4, 2012

(86) PCT No.: PCT/KR2012/004406
§ 371 (c)(1),
(2), (4) Date: Dec. 3, 2013

(87) PCT Pub. No.: WO2012/165930
PCT Pub. Date: Dec. 6, 2012

(65) Prior Publication Data
US 2014/0099940 A1    Apr. 10, 2014

Related U.S. Application Data

(60) Provisional application No. 61/493,159, filed on Jun. 3, 2011.

(30) Foreign Application Priority Data

Jun. 4, 2012    (KR) .......................... 10-2012-0060019

(51) Int. Cl.
*H04W 24/08*    (2009.01)
*H04W 24/10*    (2009.01)

(52) U.S. Cl.
CPC .................................. *H04W 24/10* (2013.01)

(58) Field of Classification Search
CPC .............................. H04W 24/10; H04W 24/08
(Continued)

(56) References Cited

U.S. PATENT DOCUMENTS 7,756,072 B1    7/2010    Fenner et al.
8,897,150 B2    11/2014   Jung et al.
(Continued)

FOREIGN PATENT DOCUMENTS

CN    102202284 A    9/2011
CN    102291758 A    12/2011
(Continued)

OTHER PUBLICATIONS

International Search Report dated Dec. 17, 2012 in connection with International Patent Application No. PCT/KR2012/004406, 3 pages.
(Continued)

*Primary Examiner* — Nathan Taylor

(57) ABSTRACT

The present invention relates to a method and apparatus for efficiently controlling a minimization of drive test (MDT) in a plurality of public land mobile networks (PLMNs). The method for controlling an MDT of a terminal according to one embodiment of the present invention comprises the steps of: performing a tracking-area update; receiving a logged measurement configuration message; determining whether or not the received logged measurement configuration message comprises an MDT PLMN list; and a applying, if the MDT PLMN is comprised, the MDT PLMN list to the MDT. The method and apparatus according to the present invention may efficiently control an MDT in a plurality of PLMNs.

16 Claims, 8 Drawing Sheets

(58) Field of Classification Search
USPC .................................................... 455/422.1
See application file for complete search history.

(56) References Cited

U.S. PATENT DOCUMENTS

| | | | |
|---|---|---|---|
| 2010/0318715 | A1 | 12/2010 | Young |
| 2011/0194441 | A1 | 8/2011 | Jung et al. |
| 2011/0306345 | A1* | 12/2011 | Wu ................. H04W 24/10 455/436 |
| 2012/0108199 | A1* | 5/2012 | Wang ............... H04W 24/10 455/405 |
| 2013/0129006 | A1* | 5/2013 | Kumar ............. H04L 27/2607 375/295 |
| 2013/0183978 | A1* | 7/2013 | Keskitalo .......... H04W 24/10 455/436 |
| 2014/0051428 | A1* | 2/2014 | Jung ................. H04W 24/10 455/422.1 |
| 2014/0056168 | A1* | 2/2014 | Jung ................. H04W 24/10 370/252 |
| 2014/0064132 | A1 | 3/2014 | Liu et al. |
| 2015/0044972 | A1* | 2/2015 | Lee .................. H04W 24/10 455/67.11 |

FOREIGN PATENT DOCUMENTS

| | | |
|---|---|---|
| KR | 10-2010-0088085 | 8/2010 |
| KR | 10-2010-0138775 | 12/2010 |

OTHER PUBLICATIONS

Written Opinion of International Searching Authority dated Dec. 17, 2012 in connection with International Patent Application No. PCT/KR2012/004406, 5 pages.

3GPP TS 37.320 V1.0.0, 3rd Generation Partnership Project; Technical Specification Group TSG RAN Universal Terrestrial Radio Access (UTRA) and Evolved Universal Terrestrial Radio Access (E-UTRA), "Radio Measurement Collection for Minimization of Drive Tests (MDT)", Overall description, Stage 2 (Release 10), Sep. 22, 2010, 15 pages.

3GPP TSG RAN #69, R2-101141, "MDT Configuration for Logging in Idle Mode", Feb. 22-26, 2010, San Francisco, CA, 2 pages.

Extended European Search Report dated Apr. 22, 2015 in connection with European Patent Application No. 12794037.7; 13 pages.

"Study on Minimization of Drive-Tests in Next Generation Networks"; 3GPP TR 36.805; V9.0.0 (Dec. 2009); France; Apr. 5, 2009; 24 pages.

"Evolved Universal Terrestrial Radio Access (E-UTRA)" 3GPP TS 36.331; V10.1.0 (Mar. 2011); France; Mar. 30, 2011; 290 pages.

"Telecommunication Management; Subscriber and Equipment Trace; Trace Control and Configuration Management"; 3GPP TS 320.422; V10.3.0 (Mar. 2011); France Apr. 11, 2011; 111 pages.

"Radio Resource Control (RRC); Protocol Specification"; 3GPP TS 25.331; France; Apr. 11, 2011; 1863 pages.

"LS on Multi-PLMN Logged MDT and RLF Reporting"; 3GPP TSG RAN WG2 Mtg #77bis; R2-121983; Jeju, Korea; Mar. 26-30, 2012; 1 page.

"Introducing REL-11 MDT Enhancements"; 3GPP TSG-RAN WG3 #76; Tdoc R3-12196; Prague, Czech Republic; May 21-25, 2012; 3 pages.

State Intellectual Property Office of the P.R.C., "First Office Action," Application No. 2012800373468, Oct. 31, 2016, 17 pages, publisher SIPO, Beijing Shi, China.

Samsung, "Introducing REL-11 MDT enhancements Discussion and decision," R3-121196, 3GPP TSG-RAN WG3 #76, Prague, Czech Republic, May 25, 2012, 3 pages.

* cited by examiner

METHOD AND APPARATUS FOR EFFICIENTLY CONTROLLING AN MDT IN A PLURALITY OF PLMNS

CROSS-REFERENCE TO RELATED APPLICATION(S)

The present application claims priority under 35 U.S.C. §365 to International Patent Application No. PCT/KR2012/004406 filed Jun. 4, 2012, entitled "METHOD AND APPARATUS FOR EFFICIENTLY CONTROLLING AN MDT IN A PLURALITY OF PLMNS". International Patent Application No. PCT/KR2012/004406 claims priority under 35 U.S.C. §365 and/or 35 U.S.C. §119(a) to U.S. Provisional Application No. 61/493,159 filed Jun. 3, 2011 and Korean Patent Application No. 10-2012-0060019 filed Jun. 4, 2012 and which are incorporated herein by reference into the present disclosure as if fully set forth herein.

FIELD OF THE INVENTION

The present invention relates to a method and apparatus for controlling MDT efficiently in multiple PLMNs.

The present invention proposes an efficient Minimization of Drive Test (MDT) control method that is capable of allowing a terminal performing MDT to log and report in a plurality of Public Land Mobile Networks (PLMNs). In the present invention, the base station sends an MDT PLMN list as a subset of the equivalent PLMN (ePLMN) list such that the terminal performs MDT operation, i.e. log and report operation, in the PLMNs indicated by Registered PLMN (RPLMN) for use in receiving MDT configuration and the MDT PLMN.

BACKGROUND OF ART

The mobile communication system has been developed for the user to communicate on the move. With the rapid advance of technologies, the mobile communication system has evolved to the level capable of providing high speed data communication service as well as voice telephony service. Recently, as one of the next generation mobile communication system, Long Term Evolution-Advanced (LTE-A) is on the standardization by the $3^{rd}$ Generation Partnership Project (3GPP). LTE-A is a technology designed to provide a packet-based communication service at a data rate higher than those of the current communication technologies.

With the evolution of the 3GPP standard, many studies being conducted for optimization of radio networks as well as improvement of data rate. In the initial radio network configuration or optimization stage, a base station or a base station controller should collect radio environment information related to its own cell coverage, and this process is called Drive Test. The conventional drive test is very time-consuming and laborious task performed in such a way that an operator carries the test apparatuses on a vehicle while performing the measurement task repeatedly for a long time.

The measurement result is used to configure the system parameters of the base stations or base station controllers. Such a conventional drive test increases total costs and time of the radio network optimization and maintenance. Study on minimization of drive tests and enhancement of radio environment analysis process and manual configuration is being conducted in the name of MDT (Minimization of Drive Test). In more detail, the terminal measures the cell information and supplementary information on the neighbor eNBs. The terminal reports the radio channel measurement information to the eNB periodically or immediately in response to a specific event or after a predetermined time has elapsed from the time point when the radio channel measurement information has been logged. At this time, the UE operation of transmitting the measured cell information and other supplementary information to the UE is referred to as MDT measurement information report. If it is in the state capable of communicating with the eNB, the terminal transmits the neighbor cell information measurement result to the eNB immediately. Otherwise, if it is not in the state capable of communicating with the eNB, the terminal retains the logged measurement information and, when it becomes possible to communicate with the eNB, transmits the retained MDT measurement report.

In the following description, the radio channel information measured by the terminal and other supplementary information are referred to as MDT measurement information, and the operation transmitting the MDT measurement information from the terminal to a base station is referred to as MDT measurement information report. When reporting MDT measurement information, if it is possible to communicate with the base station, the terminal transmits the MDT measurement information immediately. Otherwise, it is impossible to communicate with the base station currently, the terminal waits until it becomes possible to communicate with the base station. The base station uses the MDT measurement information reported by the terminal for cell area optimization.

FIG. 1 is a diagram illustrating a concept of the MDT procedure according to the conventional technology.

The conventional drive test is performed in a way of measuring signal state while roaming around the service area to search for shadow areas on a vehicle carrying the measurement device. In MDT, the terminal performs this operation instead.

Referring to FIG. 1, a Network Monitoring System (NMS) 105 instructs to perform MDT. At this time, the NSM 105 provides an Element Manager (EM) 110 with configuration information necessary for MDT. The EM 110 generates MDT configuration to an evolved Node B (eNB) 115. The eNB 115 sends a User Equipment (UE) 120 the MDT configuration information to instruct to perform MDT as denoted by reference number 125. The UE 120 performs MDT to collect MDT measurement information. The MDT information may include location and time information as well as the signal measurement information. The collected MDT measurement information is reported to the eNB 115 as denoted by reference number 130, and the eNB 115 sends the MDT measurement information to a Trace Collection Entity (TCE) 135. The TCE 135 is a server for collecting MDT measurement information.

FIG. 2 is a signal flow diagram illustrating an MDT procedure for logging MDT measurement information in idle mode and reporting the MDT measurement information according to the conventional technology.

Referring to FIG. 2, the eNB 205 sends the UE 200 in idle mode the information necessary for configuring MDT, i.e. MDT configuration information. The MDT configuration information includes absolute reference time, sampling cycle, measurement duration, etc.

The sampling cycle is used for periodic downlink pilot signal measurement and the MDT measurement information is collected and logged at the predetermined period. The measurement duration denotes the total time for performing MDT. If the measurement duration passes, the UE stops MDT.

If the Radio Resource Control (RRC) state transitions from the connected mode to the idle mode, the UE starts MDT at step 215. After performing initial MDT measurement and log at step 220, the UE 200 continues MDT measurement and log at a sampling interval 230 indicated by the channel measurement configuration information at step 225.

At every MDT measurement and log period, the MDT measurement information is logged. For example, the MDT measurement information may include a Global Cell ID, Measurement Result, Location Information, Time Stamp, etc.

If the UE 200 enters the connected mode at step 235, it notifies the eNB 204 of the presence/absence of the logged MDT measurement information at step 240. The eNB 205 may request for the report depending on the situation. If there is a request from the eNB, the UE 200 reports the MDT measurement information logged until then and deletes the reported information. If there is no request from the eNB 205, the UE retains the logged information.

The UE 200 transitions to the idle mode at step 245 and, if the measurement duration has not expired, continues MDT operation to collect MDT measurement information at steps 250 and 255. The measurement duration may be configured in consideration of the time of the connected mode or not. If the measurement duration expires at step 260, the UE stops MDT. Afterward, the UE 200 enters the connected mode at step 265 and performs MDT measurement report procedure at step 270. That is, the UE 200 notifies the eNB 205 of the presence/absence of the logged MDT measurement information and, if the eNB 205 requests, reports the logged the MDT measurement information.

If the MDT procedure is performed in the situation where a plurality of PLMNs exists, there is a need of a method for controlling the MDT efficiently.

DISCLOSURE OF INVENTION

Technical Problem

The present invention aim to provide a method and apparatus for controlling MDT efficiently in a situation where a plurality of PLMNs exists.

Solution to Problem

In accordance with an aspect of the present invention, a Minimization of Driving Test (MDT) control method of a terminal includes performing Tracking Area Update, receiving a Logged Measurement Configuration message, determining whether the Logged Measurement Configuration message includes an MDT Public Land Mobile Network (PLMN) list, and applying, when the MDT PLMN list is included, the MDT PLMN list to the MDT.

In accordance with another aspect of the present invention, a Minimization of Driving Test (MDT) control method of a base station includes receiving an equivalent Public Land Mobile Network (ePLMN), generating an MDT PLMN list with PLMNs selected from the ePLMN; and transmitting a Logged Measurement Configuration message including the MDT PLMN list to a terminal.

In accordance with another aspect of the present invention, a Minimization of Drive Test (MDT) control apparatus of a terminal includes a transceiver which transmits and receives data and a controller which controls performing Tracking Area Update, receiving a Logged Measurement Configuration message, determining whether the Logged Measurement Configuration message includes an MDT Public Land Mobile Network (PLMN) list, and applying, when the MDT PLMN list is included, the MDT PLMN list to the MDT.

In accordance with still another aspect of the present invention, a Minimization of Drive Test (MDT) control apparatus of a base station includes a transceiver which transmits and receives data and a controller which controls receiving an equivalent Public Land Mobile Network (ePLMN), generating an MDT PLMN list with PLMNs selected from the ePLMN, and transmitting a Logged Measurement Configuration message including the MDT PLMN list to a terminal.

Advantageous Effects of Invention

The MDT control method and apparatus of the present invention is capable of controlling MDT efficiently in an environment where a plurality of PLMNs exists.

MODE FOR THE INVENTION

In the following description, the MDT measurement information includes the radio channel measurement information measured by a UE and other supplementary information.

In the following description, the MDT measurement information report is the operation in that the UE transmits the MDT measurement information to the eNB.

In the following description, the MDT configuration information is the information necessary for MDT configuration and includes sampling cycle and measurement duration.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
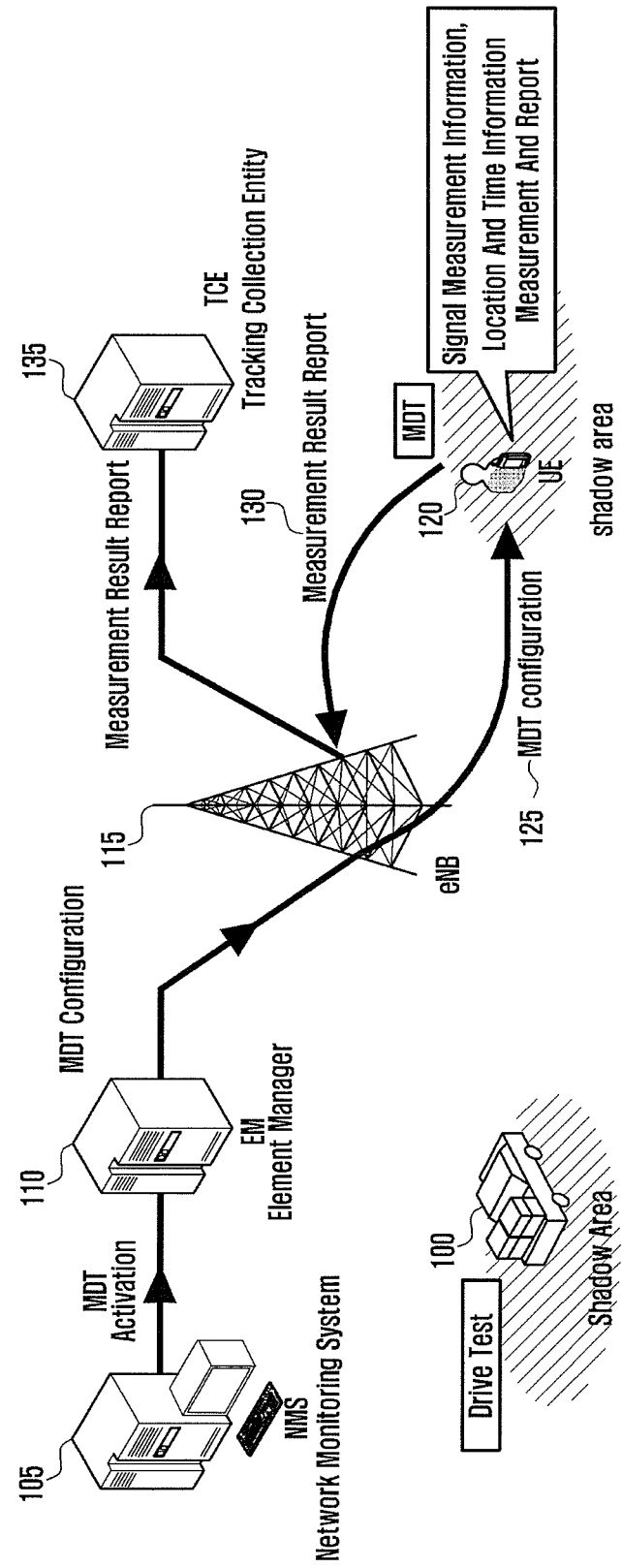
FIG. 1 is a diagram illustrating a concept of the MDT procedure according to the conventional technology.
Figure 2:
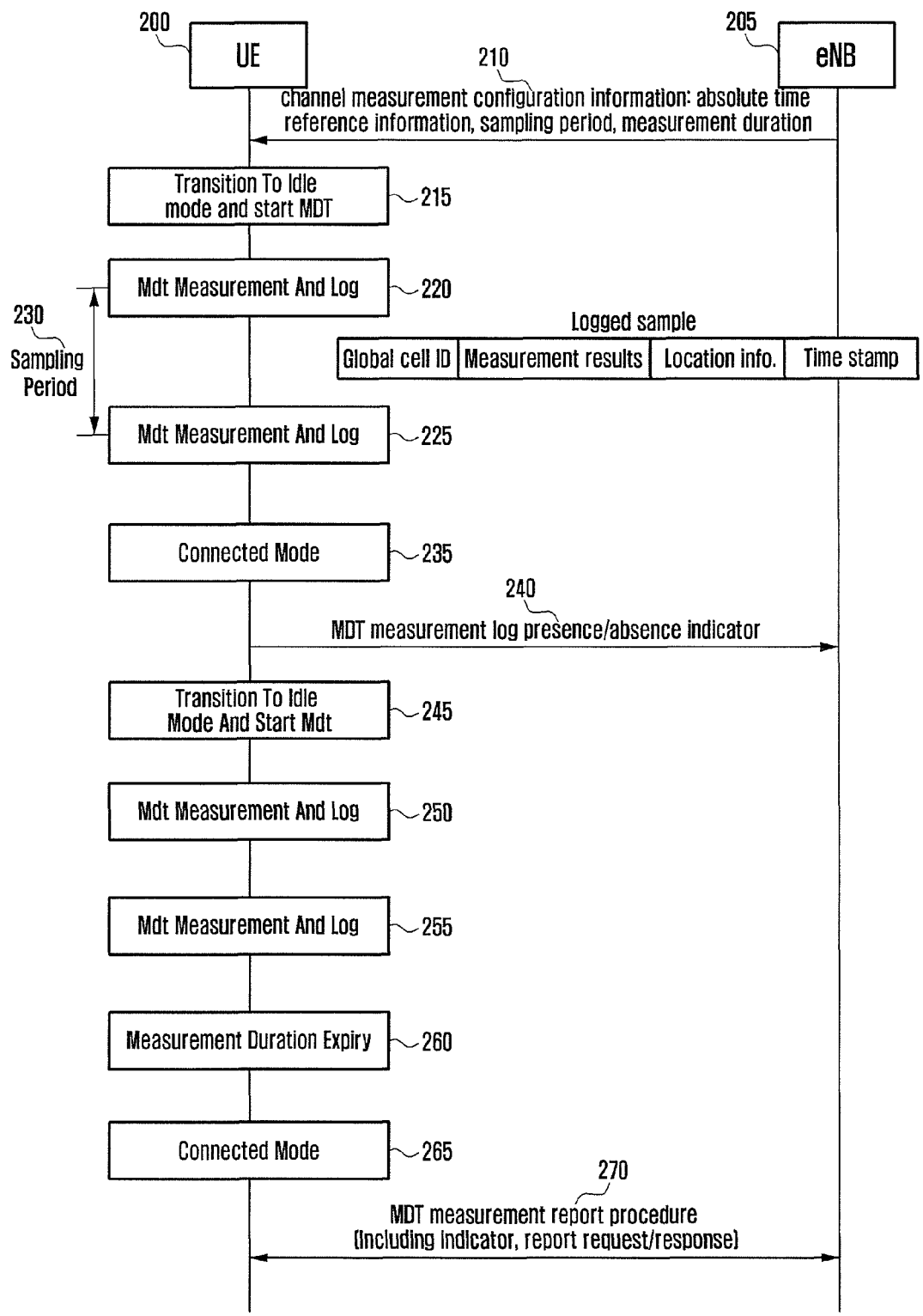
FIG. 2 is a signal flow diagram illustrating an MDT procedure for logging MDT measurement information in idle mode and reporting the MDT measurement information according to the conventional technology.
Figure 3:
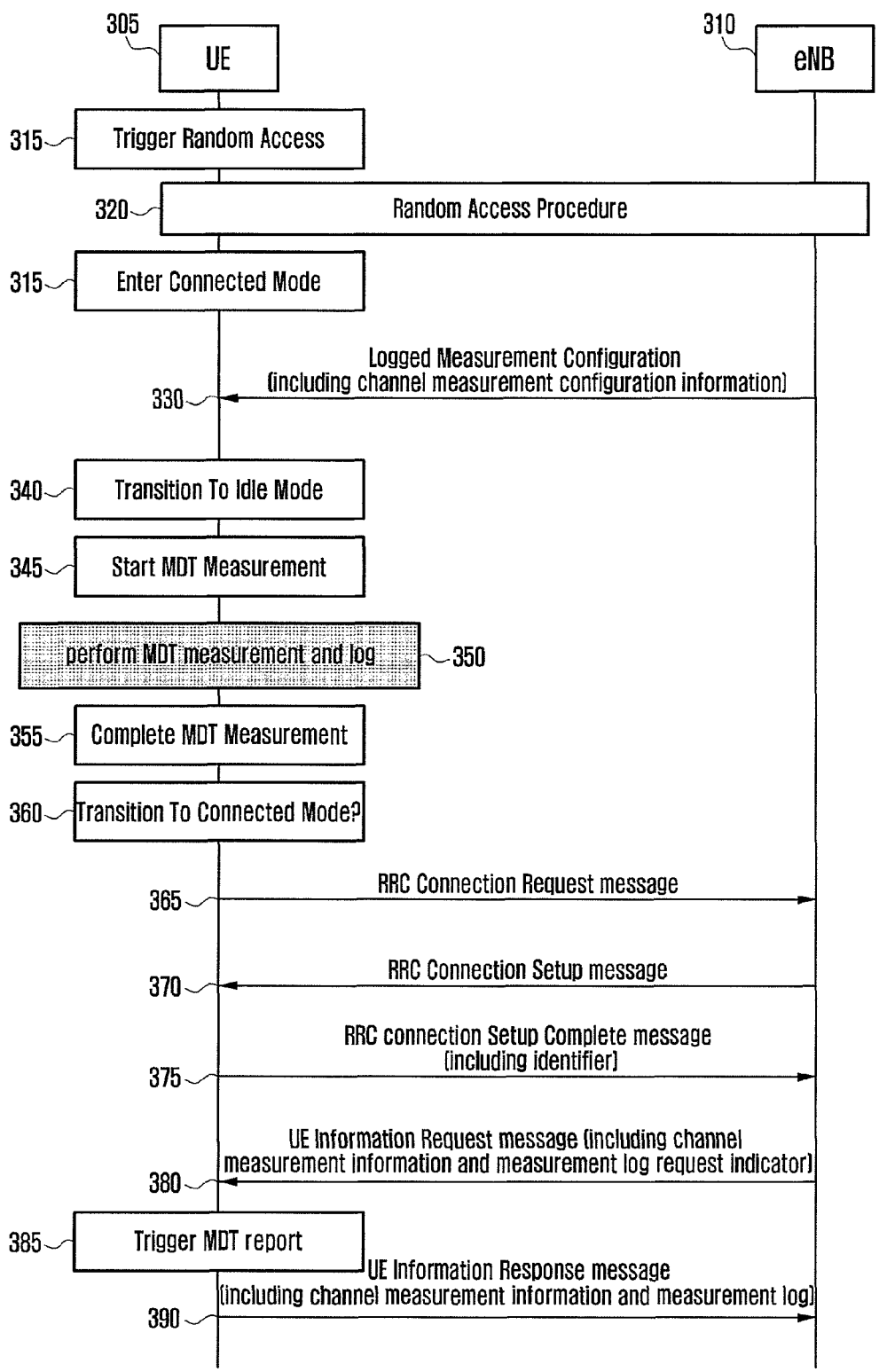
FIG. 3 is a signal flow diagram illustrating an MDT measurement information report procedure of the UE according to an embodiment of the present invention.

FIG. 3 is a signal flow diagram illustrating an MDT measurement information report procedure of the UE according to an embodiment of the present invention.

The UE triggers random access for communication with the eNB 310 at step 315 and performs a random access procedure at step 320. Afterward, the UE 305 enters the connected mode at step 325.

The eNB 310 connected to the UE 305 sends the UE 305 the information necessary for performing MDT, i.e. channel measurement configuration information (MDT configuration) through a Logged Measurement Configuration Message at step 330. Afterward, the UE 305 transitions to the idle mode at step 340 and, when MDT measurement duration starts, starts the MDT measurement at step 345. The UE 305 performs MDT measurement and logs the measurement result at step 350.

If the MDT measurement duration expires, the UE 305 stops MDT measurement at step 355. Afterward, the UE 305 transitions to the connected mode at step 360 and sends the eNB 310 an RRC Connection Request message (RRCConnectionRequest) at step 360. If the RRC Connection Request message (RRCConnectionRequest) is received, the eNB 310 sends the UE 305 an RRC Connection Setup message (RRCConnectionSetup) at step 370. If the RRC Connection Setup message (RRCConnectionSetup) is received, the UE 305 sends the eNB an RRC Connection Setup Complete (RRC Connection Setup Complete) message including an indicator to notify the eNB 310 that there is the channel measurement information logged in the idle mode at step 375.

The identifier included in the RRC Connection Setup Complete message informs the eNB 310 of the presence/absence of the logged MDT measurement information such that the eNB 310 determines whether to request for the MDT measurement information based on the identifier. For example, since the UE 305 stays in the idle mode typically for a long time such that a large amount of channel measurement information may be accumulated. In this case, the UE has to consume a large amount of resource for transmitting the logged information when it transitions to the connected mode. Accordingly, the eNB 310 determines whether to request for the MDT measurement information in consideration of the current radio capacity condition. If it is determined that the channel measurement information logged by the UE 305 is useful, the eNB 310 transmits a UE Information Request message (UEInformationRequest) including an indicator requesting for MDT configuration and measurement log at step 380.

If the UE Information Request message (UEInformationRequest) is received, the UE triggers MDT measurement information report at step 385. The UE 305 sends the eNB 310 a UE Information Response message (UEInformationResponse) including MDT measurement information at step 390. The UE 305 may delete the MDT measurement information reported to the eNB 310. Typically, the logged MDT measurement information is not required to be transmitted urgently, it may be transmitted in consideration of priorities of other RRC messages and normal data.

In the MDT rule defined in the legacy 3GPP Rel-10, if the RPLMN at the time when the measurement configuration message including MDT configuration matches the current RPLMN, the UE may performs the procedure of FIG. 3 in the corresponding RPLMN.

The present invention relates to a method for providing the UE with a PLMN list to perform MDT in a plurality of PLMNs, the PLMN list being provided explicitly through AS signaling. According to an embodiment of the present invention, the PLMN list for use in MDT procedure may be included in the measurement configuration message. If at least one of the RPLMN at the time when the measurement configuration message is received and the PLMNs included in the PLMN list carried in the message matches the current RPLMN, the UE follows the rule defined in the legacy 3GPP Rel-10 MDT. That is, if the RPLMN at the time when the measurement configuration message is received matches the current RPLMN, the UE in idle mode may perform the logged MDT.

The list is transmitted from the eNB to the UE, and the PLMN list may be included in a new IE or legacy Area scope (i.e. areaConfiguration) IE. The present invention proposes a rule of configuring the corresponding list, a list transfer method, and related UE operation. The list is referred to as MDT PLMN list.

In the present invention, the PLMNs constituting the MDT PLMN list are selected from the ePLMN list. That is, the MDT PLMN list is a subset of the ePLMN list and, in order to notify the UE of this, the AS signaling for the legacy measurement configuration message is used. In the present invention, the RPLMN at the time when the measurement configuration message is received is included in PLMNs capable of performing MDT and notified to the UE explicitly in the list or implicitly as in the legacy Rel-10 MDT. That is, since it is the RPLMN at the time when the measurement configuration message is received, there is no need of notifying of it through signaling explicitly. However, it is included in the PLMN list for performing MDT which is stored in the UE for management. The MDT PLMN list is a subset of the ePLMN list, and a bitmap may be used for indicating the PLMNs included in both the ePLMN list and MDT PLMN list.

Figure 4:
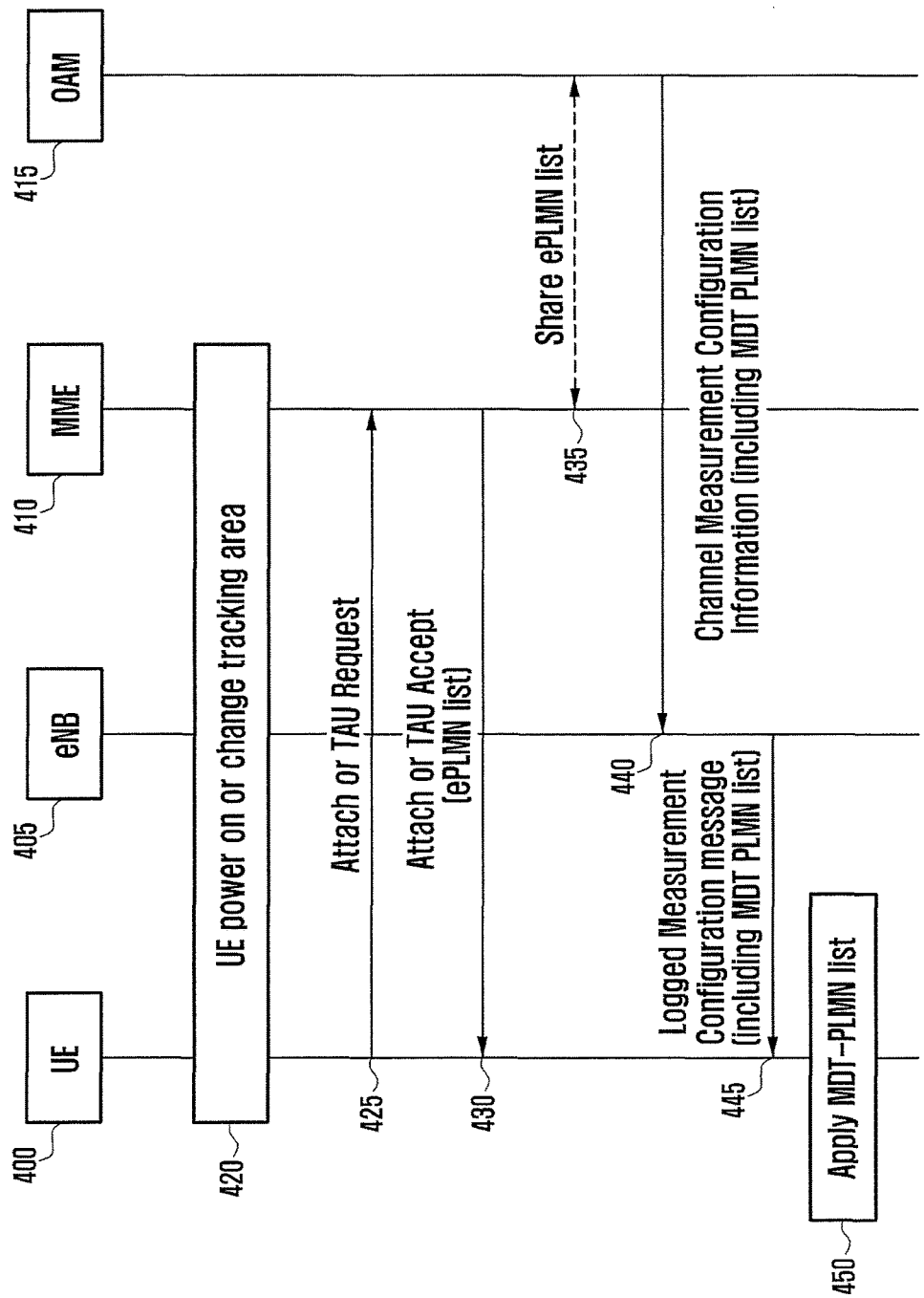
FIG. 4 is a signal flow diagram illustrating a procedure of providing MDT PLMN list.

FIG. 4 is a signal flow diagram illustrating a procedure of providing MDT PLMN list.

If the UE 400 powers on or changes Tracking Area at step 420, it performs Attach or Tracking Area Update (TAU) procedure. Typically, the ePLMN list is determined in the Attach or TAU procedure. In order to update the ePLMN list stored in the UE, the TAU procedure is required. In order to transmit an Attach or TAU request to the MME 410, a NAS container is used and this is transferred to the eNB 405. The eNB 405 forwards this to the MME 410. The Attach or TAU request may include the PLMN selected by the UE 400. If the UE 400 completes the Attach or TAU procedure successfully, the Selected PLMN is regarded as Registered PLMN.

The MME 410 sends the UE the Attach or TAU accept message via the eNB 405 at step 430. The ePLMN list is determined by the MME 410, and the NAS message includes the ePLMN list applied to the UE. The Attach or TAU accept message is transparent to the eNB such that the eNB does not know about ePLMN list. As aforementioned, the MDT PLMN list may be defined as a subset of the ePLMN list. Accordingly, the entity triggering MDT has to know the ePLMN list of a certain UE. Step 435 shows this conceptually and, if it is assumed that a specific OAM 415 triggers MDT, the OAM also has to know the ePLMN list. Among the PLMNs included in the ePLMN list, the PLMNs to which the UE is capable of performing MDT are selected, and the selected PLMNs are included in the MDT PLMN list. The UE 400 may perform the measurement information log and report procedure for only the PLMNs included in the RPLMN from which the MDT configuration has been received and the PLMNs included in the PLMN list.

The MDT configuration including MDT PLMN list is provided to the eNB 405 at step 440. The eNB 405 provides the UE 400 with the MDT PLMN list using the measurement configuration message at step 445. In the present invention, the MDT PLMN list transmitted from the eNB to the UE is a subset of the ePLMN list and formatted in a bitmap form. The bitmap format is used only when it is transmitted from the eNB to the UE or from the time when it is transmitted from the OAM to the eNB. In the case that the bitmap format is used only between the eNB and the UE, the eNB has to form the MDT PLMN list in the form of bitmap and, for this purpose, the ePLMN list has to be provided. That is, the eNB receives the MDT PLMN list (PLMN information such as PLMN id other than bitmap) from the OAM directly or via MME and the ePLMN list from the MME directly. The eNB forms the MDT PLMN list in the form of bitmap using the two lists and sends the MDT PLMN list to the UE. If the MDT PLMN list in the form of a bitmap has been received from the OAM already, it is enough to forward the MDT PLMN list to the UE. The UE applies the MDT PLMN list at step 450.

Figure 5:
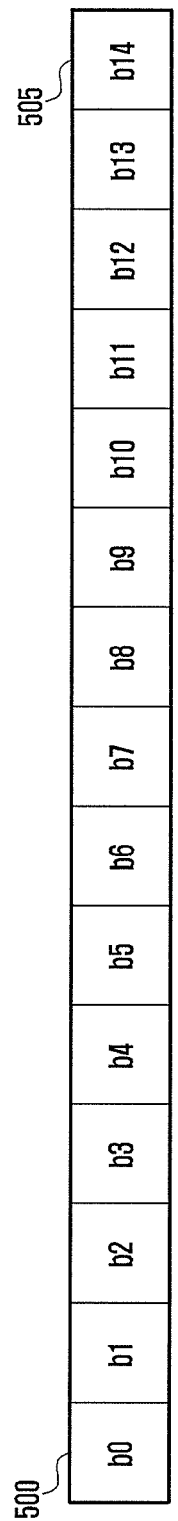
FIG. 5 is a diagram illustrating a format of the MDT PLMN list provided through AS signaling.

FIG. 5 is a diagram illustrating a format of the MDT PLMN list provided through AS signaling.

As aforementioned, the MDT PLMN list is defined as a subset of the ePLMN list in the present invention. Accordingly, all of the PLMNs included in the ePLMN list may be included in the MDT PLMN list and any ePLMN may not be included in the MDT PLMN list. In the case that the MDT PLMN list is not provided, follows the rule defined in Rel-10 MDT.

That is, the RPLMN at the time when the measurement configuration message has been received matches the current RPLMN, the UE in the idle mode may perform the logged MDT. The ePLMN list may include up to 15 PLMNs. Accordingly, the MDT PLMN list has to be configured so as to be capable of indicating up to 15 PLMNs. The indication may be performed with PLMN ID or bitmap as the most efficient method. The reason why the bitmap is the most efficient is because the MME has provided the UE with the ePLMN including PLMN IDs already and thus there is no need of informing of the MDT PLMN list using PLMN id. As shown in FIG. 5, the MDT PLMN list may be configured using the bitmap format composed of 15 bits from b0 500 to b14 505.

In FIG. 5, b0 corresponds to the first PLMN in the ePLMN list provided to the UE and the subsequent bits correspond to the subsequent PLMNs. Among the PLMNs included in the ePLMN list, the PLMNs included in the MDT PLMN list are represented by bits set to 1. Each MDT PLMN may be provided along with corresponding area configuration information. The area configuration information may include the information indicating the cell or tracking area, i.e. E-UTRAN Cell Global Identifier (ECGI) or Tracking Area Identity (TAI) or Tracking Area Code (TAC), in order for the UE to perform MDT only in a predetermined cell or Tracking Area (TA) of the corresponding MDT PLMN.

Figure 6:
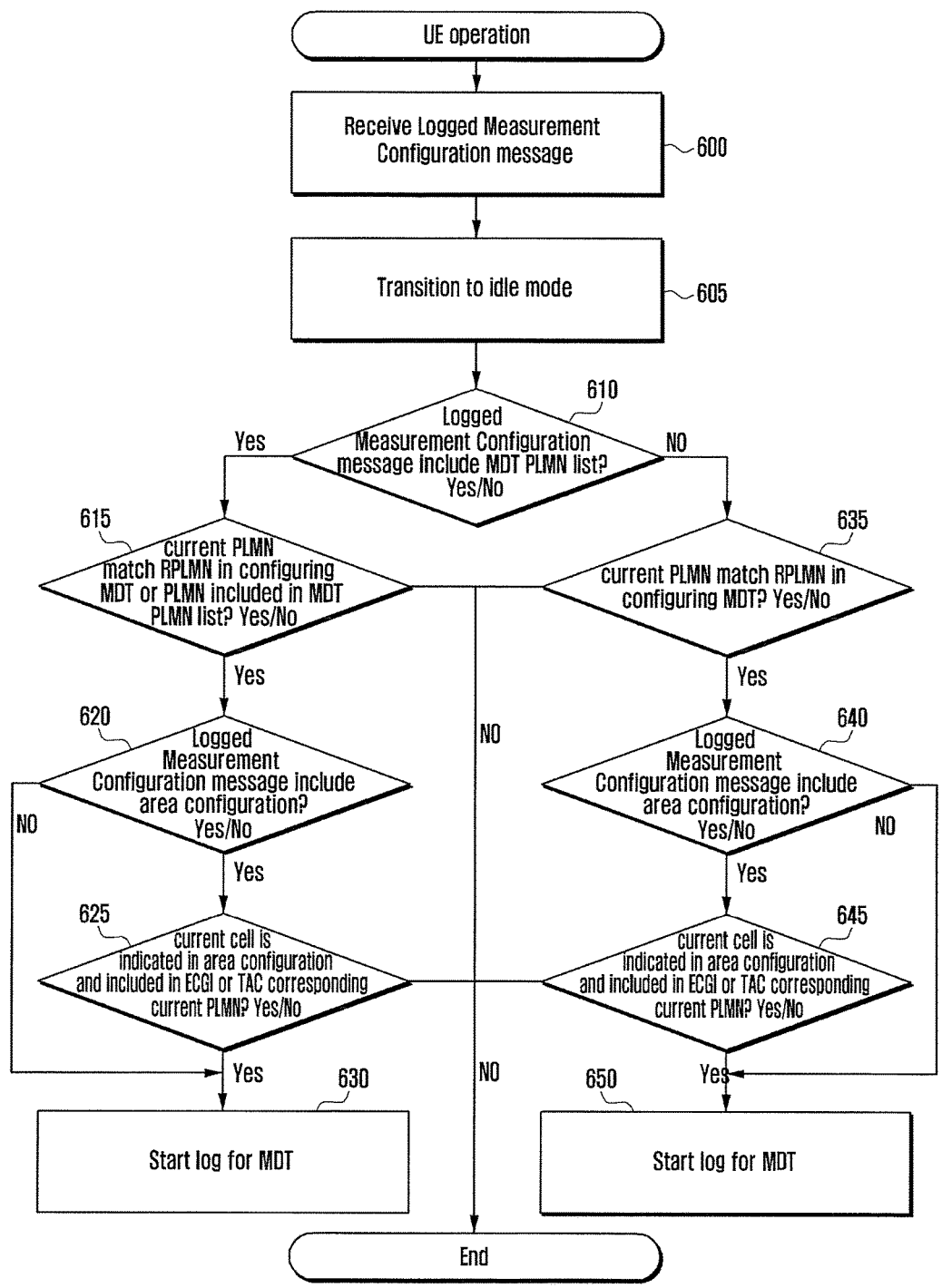
FIG. 6 is a flowchart illustrating an MDT measurement information log trigger procedure of the UE in the present invention.

FIG. 6 is a flowchart illustrating an MDT measurement information log trigger procedure of the UE in the present invention.

The UE determines whether to perform MDT measurement in consideration of RPLMN, MDT PLMN list, and area configuration associated with each MDT PLMN. The UE in the connected mode receives the measurement configuration message at step 600. The message may include the MDT PLMN list and TACs corresponding to the PLMNs included in the list. Both the MDT PLMN list and TAC information are optional and thus may not be provided. In the case that the MDT PLMN list is not included, the procedure follows the legacy Rel-10 rule and, if the TAC is not included and if the current RPLMN is the PLMN allowing for MDT, the MDT may be performed in the entire area of the PLMN.

The UE transitions to the idle mode at step 605. Afterward, the UE checks whether the received measurement configuration message includes the MDT PLMN list at step 610. If the MDT PLMN list is included, the procedure goes to step 615. Otherwise if no PLMN list is included, the procedure goes to step 635.

The UE determines whether the current RPLMN matches RPLMN at the time when the measurement configuration message has been received or one of the PLMNs included in the MDT PLMN list at step 615. If the current RPLMN matches RPLMN at the time when the measurement configuration message has been received or one of the PLMNs included in the MDT PLMN list, the procedure goes to step 620. Otherwise, the UE does not perform the logged MDT. Afterward, the UE determines whether the measurement configuration message includes the area configuration (AreaConfiguration) at step 620. If the AreaConfiguration is included, the procedure goes to step 625 and, otherwise, step 630 at which the UE perform the logged MDT immediately. If the current cell has the indication of AreaConfiguration and is included in ECGI or TAC corresponding to the current RPLMN, the procedure goes to step 630 at which the UE performs the logged MDT immediately.

The UE determines at step 635 whether the current RPLMN matches the RPLMN at the time when the measurement configuration message has been received. If the current RPLMN matches the RPLMN at the time when the measurement configuration message has been received, the procedure goes to step 640. Otherwise, the UE does not perform the logged MDT. Afterward, the UE determines whether the measurement configuration message includes the area configuration (AreaConfiguration) at step 640. If the area configuration is included, the procedure goes to step 645 and, otherwise the area configuration is not included, step 650 at which the UE perform the logged MDT immediately. If the current cell has indication on the area configuration (AreaConfiguration) and is included in ECGI or TAC corresponding to the current RPLMN, the procedure goes to step 650 at which the UE performs the logged MDT immediately.

Figure 7:
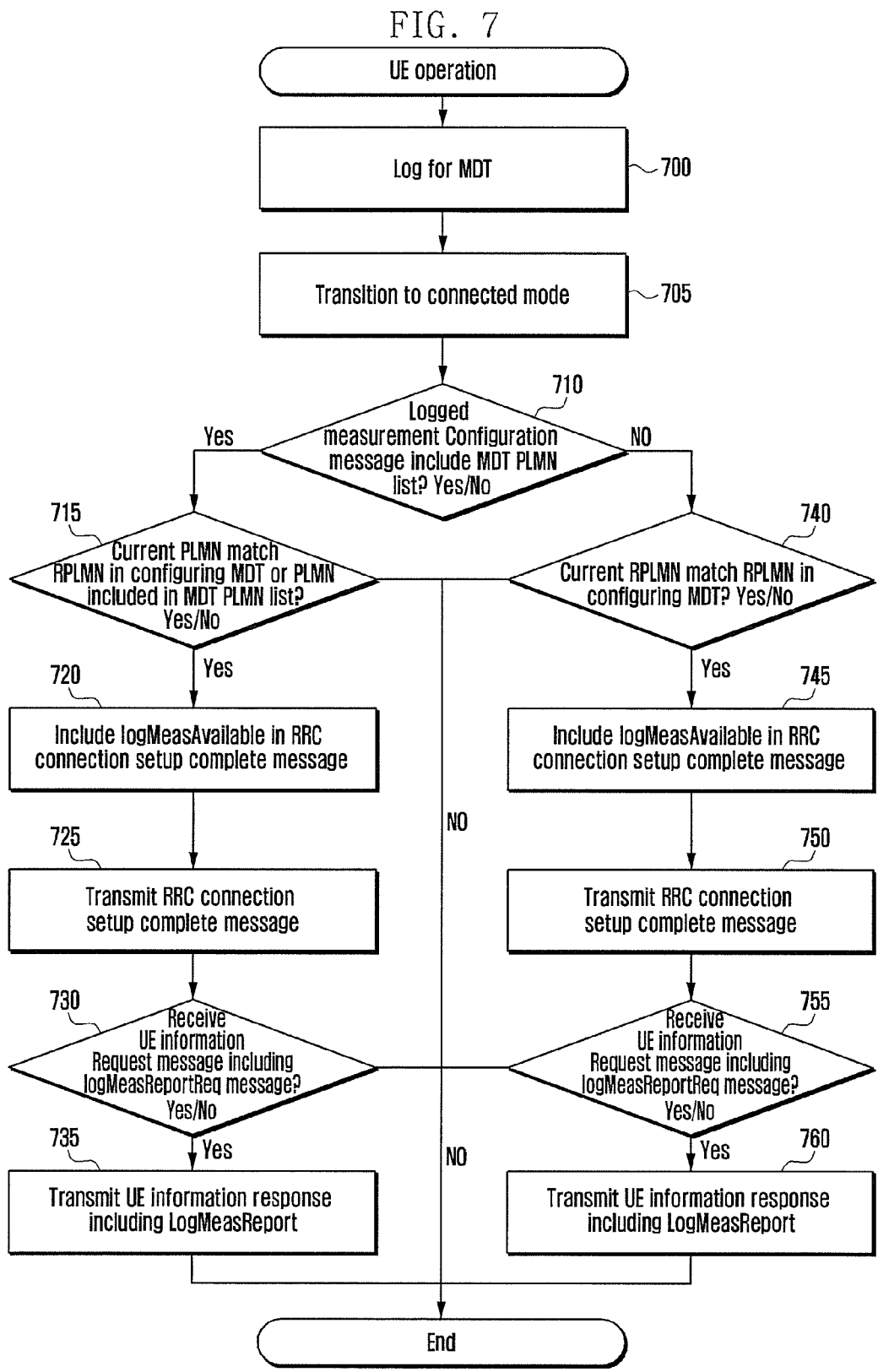
FIG. 7 is a flowchart illustrating the logged MDT measurement information report procedure in the present invention.

FIG. 7 is a flowchart illustrating the logged MDT measurement information report procedure in the present invention.

The UE determines whether to perform MDT measurement in consideration of RPLMN and MDT PLMN list. The UE in the idle mode performs the logged MDT at step 700. Afterward, the UE transitions to the connected mode at step 705. The UE determines whether the previously received measurement configuration includes the MDT PLMN list at step 710. The UE stores all informations included in the received measurement configuration and determines whether the MDT PLMN list exists based on the stored information. If the MDT PLMN list is included at step 710, the procedure goes to step 715 and, otherwise, step 740.

The UE determines whether the current RPLMN matches the RPLMN at the time of MDT configuration or one of the PLMNs in the MDT PLMN list at step 715. If it matches at least one PLMN, the procedure goes to step 720. Otherwise, the procedure ends immediately. The UE includes an IE log MeasAvailable in the RRC Connection Setup Complete message (RRC Connection Setup Complete) at step 729. The IE log MeasAvailable is an indicator for indicating that the UE has the information logged through MDT and to be reported. The UE sends the eNB the RRC Connection Setup Complete message at step 725. Afterward, the UE determines whether the UE Information Request message (UEInformationRequest) including IE log MeasReportReq is received from the eNB at step 730. The UE monitors to receive the UE Information Request message in the connected mode. If the UE Information Request message including the indicator, the UE sends the eNB a UE Information response message (UEInformationResponse) along with the IE Log MeasReport including the logged information at step 735.

If the MDT PLMN list is not included at step 710, the procedure goes to step 740 at which the UE determines whether the current RPLMN matches the RPLMN at the time of MDT configuration. If the RPLMNs match, the procedure ends immediately. The UE includes the IE log MeasAvailable in the RRC Connection Setup Complete message RRCConnectionSetupComplete) at step 745. The IE log MeasAvailable is an indicator for indicating that the UE has performed MDT and thus there is logged information to be reported. The UE sends the eNB the RRC Connection Setup Complete message at step 750. Afterward, the UE determines whether the UE Information Request message (UEInformationRequest) including IE log MeasReportReq is received from the eNB at step 755. The UE monitors to receive the UE Information Request message in the connected mode. The UE Information Request message including the indicator is received, the UE sends the eNB the UE Information Response message (UEInformationResponse) along with the IE Log MeasReport including the logged information at step 760.

FIG. 7 shows the procedure when the UE transitions from the idle mode to the connected mode. However, the UE may notify the newly connected cell of the presence/absence of logged MDT information even in the Re-establishment procedure or handover procedure. Also, if necessary, it is possible to report the logged information to the new cell. For this purpose, RRCConnectionReestablishementComplete or RRCConnectionReconfigurationComplete may include the IE log MeasAvailable. The logged information request and report also may be performed with the UE Information Request message (UEInformationRequest) and UE Information Response message (UEInformationResponse).

Figure 8:
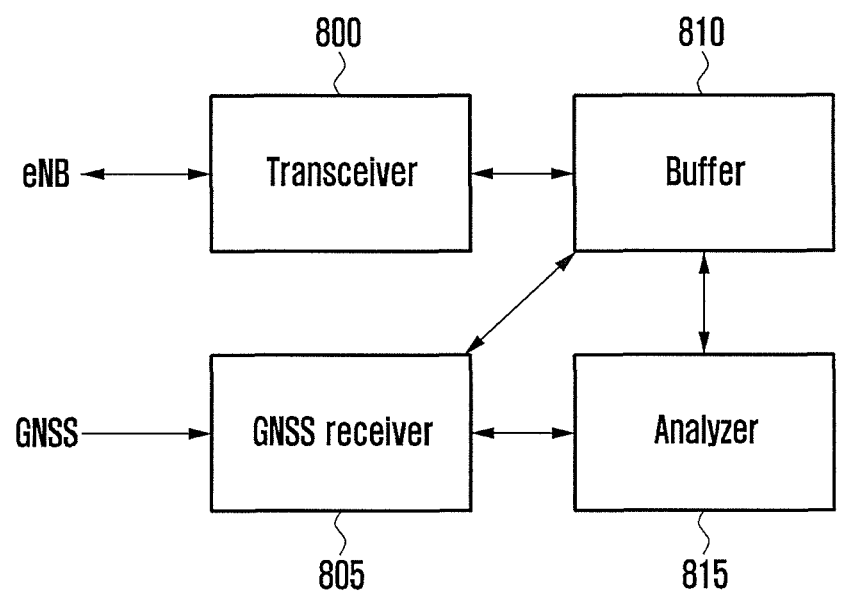
FIG. 8 is a block diagram illustrating the UE.

FIG. 8 is a block diagram illustrating the UE. The transceiver 800 receives MDT configuration from the eNB or measures channel signal. The information collected by the transceiver stored in the buffer 810. The Global Navigation Satellite System (GNSS) receiver 805 receives UE location and time stamp from the satellite signal. The collected information is stored in the buffer 810. The analyzer 815 determines whether to include the time stamp in the MDT measurement information.

The UE may further include a controller (not shown). The controller of the UE may control the overall operation of Minimization of Drive Test (MDT) procedure. The controller is also capable of performing the roles of the function blocks, e.g. analyzer 815.

The eNB may include a transceiver for transmitting and receiving data and a controller for controlling to receive ePLMN list, generate MDT PLMN list with PLMNs selected from the ePLMN list, include the MDT PLMN list in the measurement configuration message, and transmit the message to the UE.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for transmitting logged measurement by a terminal in a wireless communication system, the method comprising:
   receiving a logged measurement configuration message including a subset of an equivalent public land mobile network (ePLMN) list for the terminal from a base station;
   performing measurement and logging measurement result of the subset of the ePLMN list; and
   reporting the logged measurement result of the subset of the ePLMN list to the base station.

2. The method of claim 1, wherein the reporting of the logged measurement result is performed for at least one public land mobile network (PLMN) in the subset of the ePLMN list.

3. The method of claim 1, wherein the measurement is performed in idle mode of the terminal.

4. The method of claim 1, wherein the subset of the ePLMN list comprises identifiers of PLMNs.

5. A method for configuring logged measurement by a base station in a wireless communication system, the method comprising:
   generating a subset of an equivalent public land mobile network (ePLMN) list for a terminal;
   transmitting a logged measurement configuration message including the subset of the ePLMN list to the terminal to perform measurement and log measurement result of the subset of the ePLMN list; and
   receiving logged measurement result of the subset of the ePLMN list from the terminal.

6. The method of claim 5, wherein the generating of the subset of the ePLMN list comprises generating the subset of the ePLMN list in a form of a bitmap.

7. The method of claim 5, wherein the generating of the subset of the ePLMN list comprises generating the subset of the ePLMN list using public land mobile network identifiers (PLMN IDs).

8. The method of claim 5, wherein the logged measurement configuration message is transmitted through access stratum (AS) signaling.

9. A terminal for transmitting logged measurement in a wireless communication system, the terminal comprising:
   a transceiver configured to transmit and receive data; and
   a controller configured to control receiving a logged measurement configuration message including a subset of an equivalent public land mobile network (ePLMN) list for the terminal from a base station, performing measurement and logging the measurement result of the subset of the ePLMN list, and reporting the logged measurement result of the subset of the ePLMN list to the base station.

10. The terminal of claim 9, wherein the controller is configured to report the logged measurement result for at least one public land mobile network (PLMN) in the subset of the ePLMN list.

11. The terminal of claim 9, wherein the controller is configured to perform the measurement in idle mode of the terminal.

12. The terminal of claim 9, wherein the subset of the ePLMN list comprises identifiers of PLMNs.

13. A base station for configuring logged measurement in a wireless communication system, the base station comprising:
   a transceiver configured to transmit and receive data; and a controller configured to control generating a subset of an equivalent public land mobile network (ePLMN) list for a terminal, transmitting a logged measurement configuration message including the subset of the ePLMN list to the terminal to perform measurement and log measurement result of the subset of the ePLMN list, and receiving logged measurement result of the subset of the ePLMN list from the terminal.

14. The base station of claim 13, wherein the controller is configured to control generating the subset of the ePLMN list in a form of a bitmap.

15. The base station of claim 13, wherein the controller is configured to control generating the subset of the ePLMN list using public land mobile network identifiers (PLMN IDs).

16. The base station of claim 13, wherein the controller is configured to control transmitting the logged measurement configuration message through access stratum (AS) signaling.

\* \* \* \* \*